US009584631B2

(12) United States Patent
Lowery (10) Patent No.: US 9,584,631 B2
(45) Date of Patent: Feb. 28, 2017

(54) PROVIDING OUT-OF-BAND CONTROL AND BACKUP VIA A CELLULAR CONNECTION

(71) Applicant: Verizon Patent and Licensing Inc., Basking Ridge, NJ (US)

(72) Inventor: Andrew G. Lowery, Lewis Center, OH (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 320 days.

(21) Appl. No.: 14/095,306

(22) Filed: Dec. 3, 2013

(65) Prior Publication Data
US 2015/0156056 A1 Jun. 4, 2015

(51) Int. Cl.
*H04L 29/08* (2006.01)
*H04L 29/06* (2006.01)
*H04L 29/12* (2006.01)

(52) U.S. Cl.
CPC ............ *H04L 69/08* (2013.01); *H04L 61/106* (2013.01)

(58) Field of Classification Search
CPC .. H04L 29/08567; H04L 61/106; H04L 69/08
USPC .......................................................... 455/420
See application file for complete search history.

(56) References Cited

U.S. PATENT DOCUMENTS

| 6,915,436 | B1* | 7/2005 | Booth, III | G06F 21/42 709/223 |
| 7,995,483 | B1* | 8/2011 | Bayar | H04L 41/0893 370/241.1 |
| 8,441,942 | B1* | 5/2013 | Guha | H04L 43/0811 370/216 |
| 2002/0114322 | A1* | 8/2002 | Xu | H04L 29/06027 370/352 |
| 2003/0123465 | A1* | 7/2003 | Donahue | H04L 45/02 370/401 |
| 2003/0214913 | A1* | 11/2003 | Kan | H04L 43/0829 370/252 |

(Continued)

OTHER PUBLICATIONS

Wikipedia, "Console server", http://en.wikipedia.org/org/Console_server, Mar. 1, 2013, 2 pages.

(Continued)

*Primary Examiner* — Qun Shen (57) ABSTRACT

A translation device may receive configuration information that identifies traffic associated with messages for managing a network device via a console session with the network device. The translation device may receive a message via an air interface of a cellular network, and may compare a first parameter identified in the configuration information and a second parameter of the message. The translation device may determine that the message includes an administration message based on comparing the first parameter and the second parameter. The translation device may translate the administration message from a first format, received via the air interface, to a second format, for transmission to a console port of the network device, and may provide the translated administration message, via a wired connection, to the console port of the network device. The translated administration message may cause the network device to execute an instruction included in the translated administration message.

20 Claims, 10 Drawing Sheets

(56) References Cited

U.S. PATENT DOCUMENTS

| | | | | |
|---|---|---|---|---|
| 2004/0028052 | A1* | 2/2004 | Chen | H04L 12/5695 370/395.2 |
| 2004/0230671 | A1* | 11/2004 | Rollins | H04W 88/08 709/220 |
| 2011/0055367 | A1* | 3/2011 | Dollar | H04L 41/042 709/223 |
| 2011/0116384 | A1* | 5/2011 | Kotrla | H04L 43/0811 370/241.1 |
| 2011/0258433 | A1* | 10/2011 | Pulini | H04L 63/20 713/153 |
| 2011/0282936 | A1* | 11/2011 | Chekhanovskiy | H04L 12/2809 709/203 |
| 2012/0216259 | A1* | 8/2012 | Okamoto | H04L 12/4641 726/4 |
| 2014/0157298 | A1* | 6/2014 | Murphy | H04N 21/64322 725/14 |
| 2014/0310428 | A1* | 10/2014 | Avital | H04L 45/745 709/245 |

OTHER PUBLICATIONS

Wikipedia, "Out-of-band", http://en.wikipedia.org/wiki/Out-of-band, October 19, 2013, 3 pages.

Wikipedia, "System Console", http://en.wikipedia.org/wiki/System_console, Jul. 24, 2013, 2 pages.

Cisco Systems, Inc., "Hot Standby Router Protocol Feature and Functionality," http://www.cisco.com/c/en/us/support/docs/ip/hot-standby-router-protocol-hsrp/9234-hsrpguidetoc.html or http://www.cisco.com/en/US/tech/tk648/tk362/technologies_tech_note09186a0080094a91.shtml, Document ID: 9234, May 25, 2006, 14 pages.

Cisco Systems, Inc., "Configuring HSRP and Enhanced Object Tracking," http://www.cisco.com/c/en/td/docs/switches/blades/3040/software/release/12-2_2_44_se/configuration/guide/swhsrp.html, Chapter 38, Cisco Catalyst Blade Switch 3040 for FSC Software Configuration Guide, Jan. 11, 2008, 20 pages.

\* cited by examiner

PROVIDING OUT-OF-BAND CONTROL AND BACKUP VIA A CELLULAR CONNECTION

BACKGROUND

In computer administration, out-of-band management may refer to management of a device via a system console of the device. Out-of-band management may be provided even in the event of a device failure so that an administrator may troubleshoot and/or fix the device.

DETAILED DESCRIPTION OF PREFERRED EMBODIMENTS

The following detailed description of example implementations refers to the accompanying drawings. The same reference numbers in different drawings may identify the same or similar elements.

In computer administration, out-of-band management may refer to management of a device via a console of the device. The console may be used to input system administration messages (e.g., to configure the device, to troubleshoot the device, etc.), such as via text entry using a command line interface. A device, such as a network device (e.g., a router, a switch, a gateway, etc.) may include a console port (e.g., a serial port) via which a terminal may be attached (e.g., via a serial cable) to access the console and provide administration messages to the device. Typically, access to a device's console occurs via a physical connection between the device and an administrator's terminal, which may not be convenient for remote access to and administration of the device. Implementations described herein may provide out-of-band access to a console of a network device via a cellular connection, and may further provide a backup path for the network device using the cellular connection.

Figure 1:
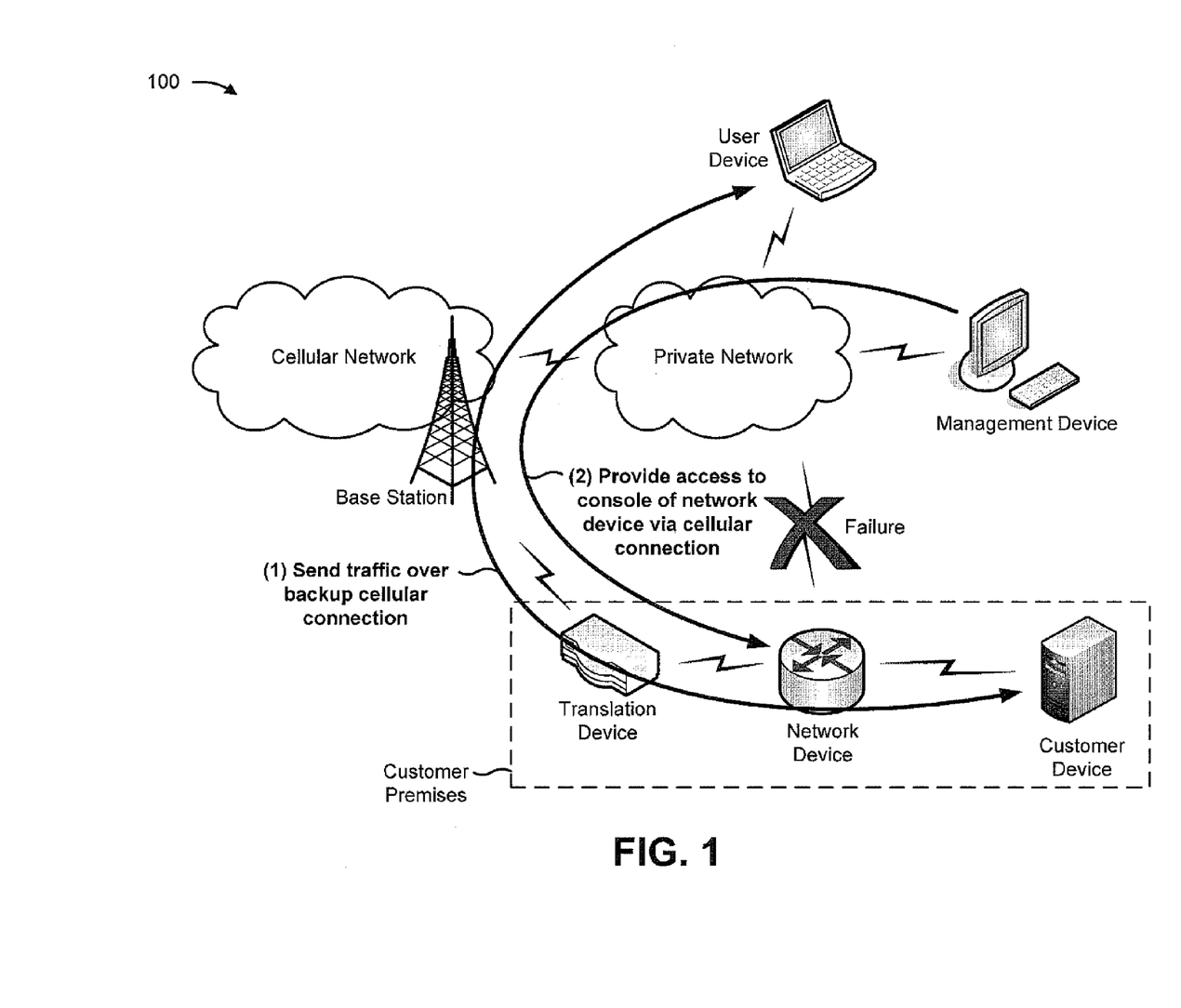
FIG. 1 is a diagram of an overview of an example implementation described herein.

FIG. 1 is a diagram of an overview of an example implementation 100 described herein. As shown in FIG. 1, a network device, a customer device, and a translation device may be located at a customer premises. For example, the network device may include a router that routes traffic to and/or from the customer device, which may include a server. The network device may send and/or receive traffic via a private network. For example, the router may route traffic between a user device and the customer device via the private network. Furthermore, a management device may be used to manage the network device by sending administration messages to the network device via the private network, which may include a wired network or a wireless network other than a cellular network.

As further shown in FIG. 1, assume that there is a failure in the connection between the network device and the private network. In this case, the network device may utilize the translation device to send traffic over a backup cellular connection, such as by using a base station to send the traffic over a cellular network (e.g., to the user device via the private network). Furthermore, the translation device may permit the management device to access the console of the network device via a cellular connection. For example, the translation device may receive an administration message, over an air interface with the base station, from the management device. The translation device may translate the administration message from a first format that is deliverable over the cellular connection to a second format that is deliverable over a serial connection with the network device, and may provide the translated administration message to the network device via a console port of the network device. In this way, connectivity of customer equipment may be maintained, and an administrator may troubleshoot the network device remotely via the cellular connection.

Figure 2:
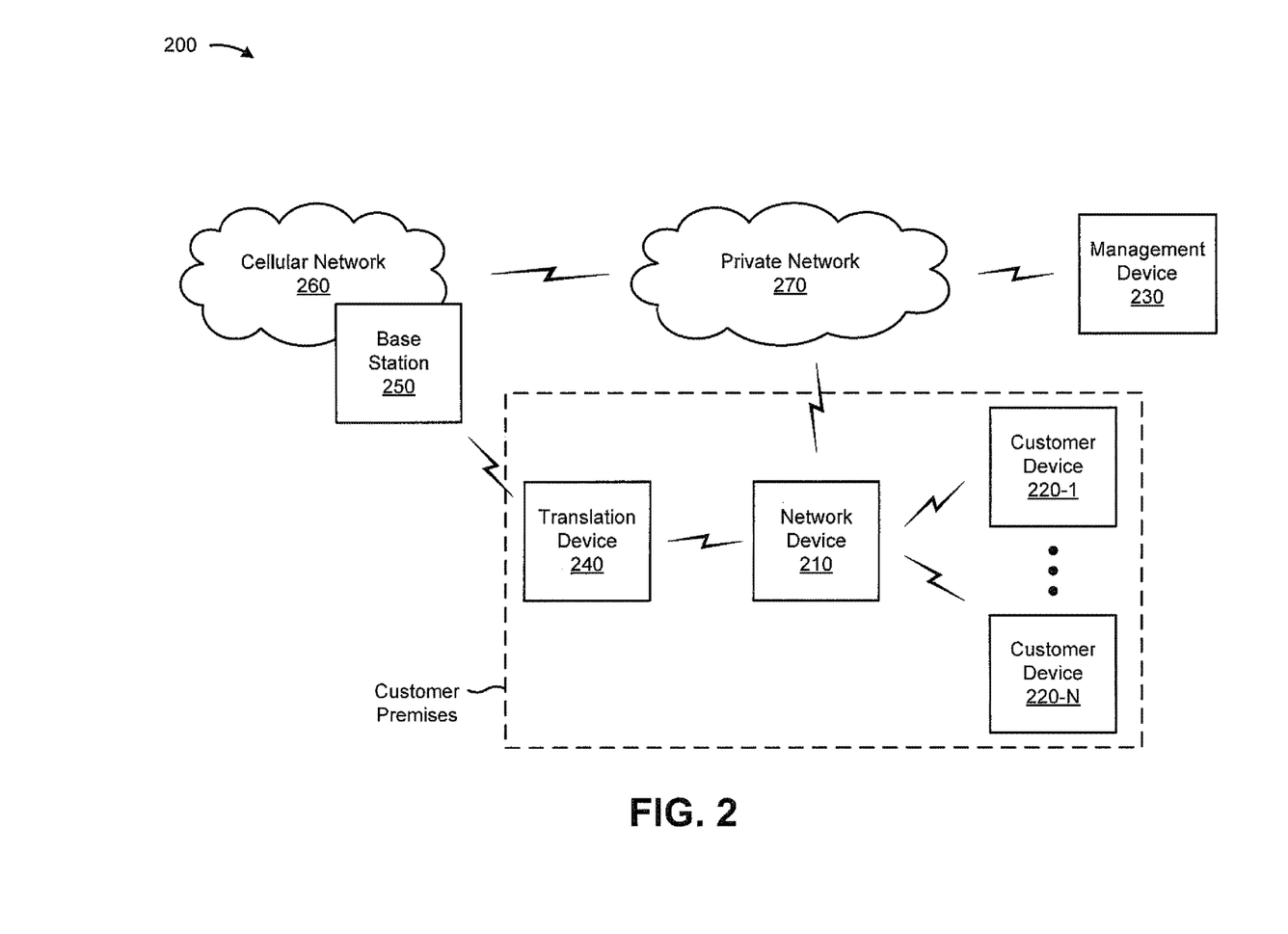
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network device 210, one or more customer devices 220-1 through 220-N (N≥1) (hereinafter referred to individually as "customer device 220," and collectively as "customer devices 220"), a management device 230, a translation device 240, a base station 250, a cellular network 260, and a private network 270. As further shown in FIG. 2, network device 210, customer devices 220, and translation device 240 may be located at a customer premises. Devices of environment 200 may interconnect via wired connections, wireless connections, or a combination of wired and wireless connections, unless described differently below.

Network device 210 may include one or more devices capable of receiving, generating, processing, storing, and/or providing network traffic, destined for and/or received from customer device 220. For example, network device 210 may include a router, a switch, a hub, a firewall, a gateway, a bridge, a load balancer, an intrusion detection system, a security device, a server (e.g., a proxy server, a reverse proxy, etc.), or a similar device. Network device 210 may be used in connection with a single customer device 220 or a group of customer devices 220 (e.g., a data center, a private network, etc.). Communications may be routed through network device 210 to reach the group of customer devices 220. For example, network device 210 may be positioned within a network as a gateway that provides access to a group of customer devices 220. Network device 210 may include a console port that provides access to a console of network device 210, such as via an Ethernet connection and/or a serial connection. Network device 210 may be managed and/or configured via the console.

Customer device 220 may include one or more devices capable of receiving, generating, processing, storing, and/or providing information associated with a customer, such as a business entity. For example, customer device 220 may include a computing device and/or a communication device, such as a server (e.g., a web server, a back-end server, a host server, a storage server, etc.), a computer (e.g., a desktop computer, a laptop computer, etc.), a point-of-sale device, or a similar device. In some implementations, customer device 220 may store information associated with the customer (e.g., sales records, customer orders, etc.). Additionally, or alternatively, customer device 220 may receive information from and/or transmit information to another device (e.g., a user device, not shown) via network device 210.

Management device 230 may include one or more devices capable of receiving, generating, processing, storing, and/or providing administration messages (e.g., used to manage and/or configure network device 210). For example, management device 240 may include a computing and communication device, such as a client terminal, a desktop computer, a laptop computer, a server, or a similar device. Management device 230 may send an administration message to network device 210, and may receive a response to an administration message from network device 210. When a direct connection between private network 270 and network device 210 fails, management device 230 may send and/or receive the messages via a backup connection that traverses, for example, translation device 240, base station 250, cellular network 260, and private network 270.

Translation device 240 may include one or more devices capable of receiving, generating, processing, storing, and/or providing network traffic, and/or capable of receiving, generating, processing, storing, and/or providing administration messages. For example, translation device 240 may include a gateway, a router (e.g., a cellular router), a switch, a hub, a bridge (e.g., a cellular bridge), a modem (e.g., a cellular modem), or a similar device. Translation device 240 may receive and/or provide traffic and/or administration messages via an air interface with base station 250 (e.g., using a cellular modem). Translation device 240 may receive and/or provide traffic and/or administration messages via a wired connection with network device 210, such as an Ethernet connection and/or a serial connection with a console port of network device 210. In some implementations, translation device 240 may provide out-of-band access to a console of network device 210 by translating administration messages between a first format compatible with a cellular connection and a second format compatible with a console port connection. Additionally, or alternatively, translation device 240 may provide a backup path for network device 210 using the cellular connection (e.g., when a direct connection between network device 210 and private network 270 experiences a failure). While shown as separate devices in FIG. 2, translation device 240 and network device 210 may be integrated into a single device in some implementations.

Base station 250 may include one or more devices capable of receiving, generating, processing, storing, and/or providing network traffic, such as media, audio, video, text, and/or other traffic, destined for and/or received from one or more devices shown in FIG. 2. In some implementations, base station 250 may include an eNodeB associated with a long term evolution (LTE) network that receives traffic from and/or sends traffic over cellular network 260 (e.g., to and/or from private network 270) via a packet data network gateway and/or a serving gateway. Additionally, or alternatively, base station 250 may be associated with a radio access network other than an LTE network. Base station 250 may send traffic to and/or receive traffic from translation device 240 via an air interface.

Cellular network 260 may include one or more wireless networks, such as one or more cellular networks. For example, cellular network 260 may include a cellular network (e.g., an LTE network, a 4G network, a 3G network, a 2G network, a code division multiple access (CDMA) network, etc.), a public land mobile network (PLMN), a Wi-Fi network, a local area network (LAN), a wide area network (WAN), a metropolitan area network (MAN), and/or a combination of these or other types of networks (e.g., a combination of a cellular network and a non-cellular network).

Private network 270 may include one or more wired and/or wireless networks. In some implementations, private network 270 may include a network other than a cellular network. For example, private network 270 may include a PLMN, a Wi-Fi network, a LAN, a WAN, a MAN, a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
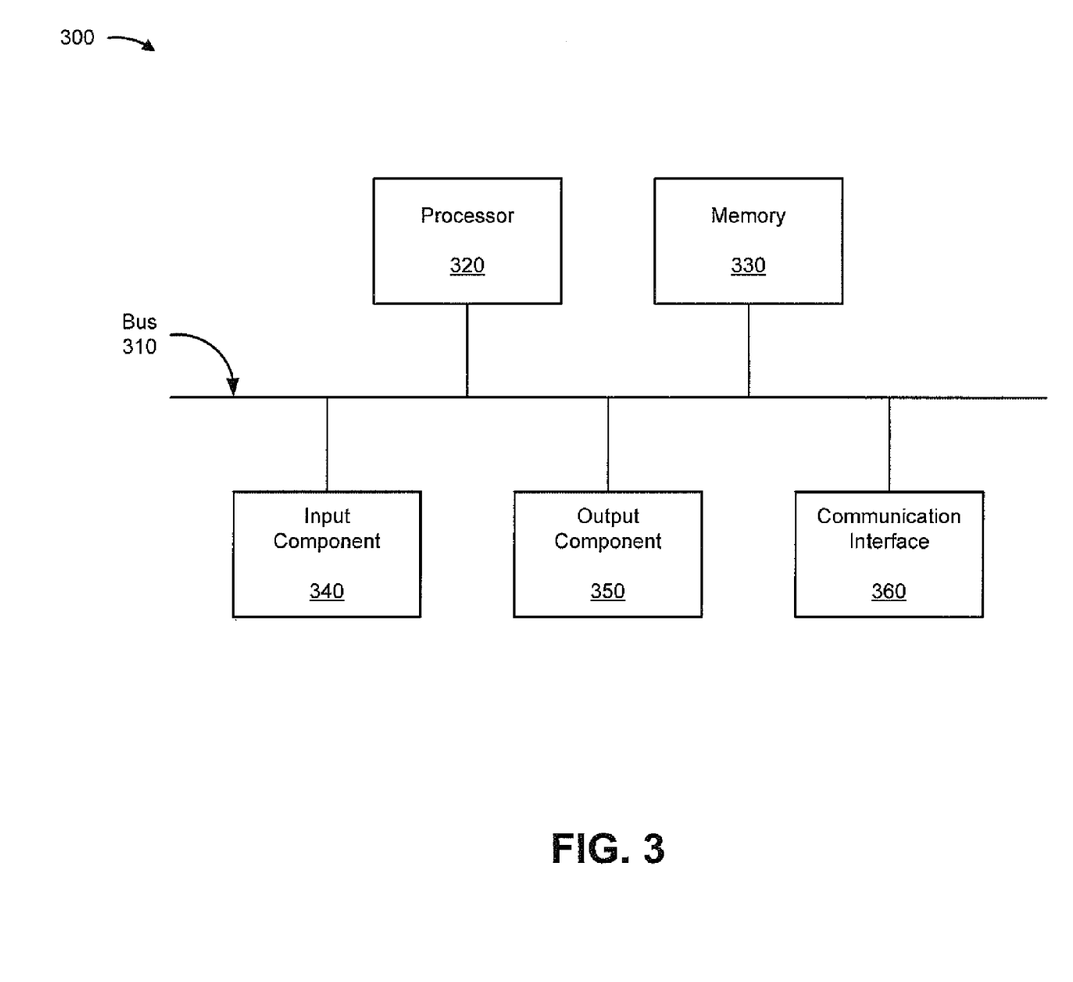
FIG. 3 is a diagram of example components of one or more devices of FIG. 2.

FIG. 3 is a diagram of example components of a device 300. Device 300 may correspond to network device 210, customer device 220, management device 230, translation device 240, and/or base station 250. In some implementations, each of network device 210, customer device 220, management device 230, translation device 240, and/or base station 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, a serial interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, one or more of the components of device 300 may perform one or more functions described as being performed by another one or more components of device 300.

Figure 4:
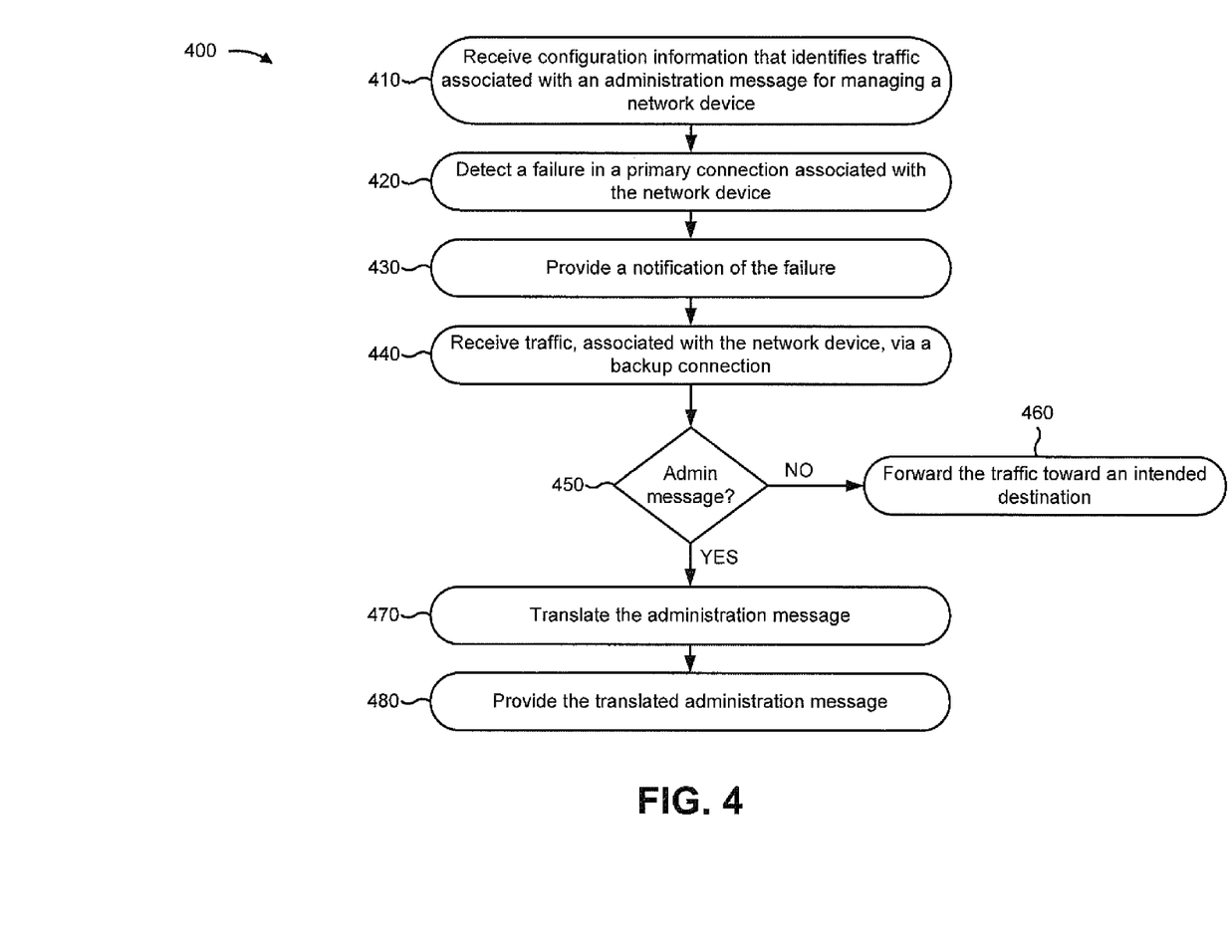
FIG. 4 is a flow chart of an example process for providing a cellular backup connection to a network device in the event of a failure in a primary connection, and providing out-of-band management access to the network device via a cellular connection.

FIG. 4 is a flow chart of an example process 400 for providing a cellular backup connection to a network device in the event of a failure in a primary connection, and providing out-of-band management access to the network device via a cellular connection. In some implementations, one or more process blocks of FIG. 4 may be performed by translation device 240. Additionally, or alternatively, one or more process blocks of FIG. 4 may be performed by another device or a group of devices separate from or including translation device 240, such as network device 210, customer device 220, management device 230, and/or base station 250.

As shown in FIG. 4, process 400 may include receiving configuration information that identifies traffic associated with an administration message for managing a network device (block 410). For example, translation device 240 may receive configuration information (e.g., from user input and/or from another device). The configuration information may be used to identify traffic associated with an administration message, such as an administration message for managing and/or configuring network device 210. For example, the configuration information may identify a network address (e.g., an Internet protocol (IP) address), such as a source address, a destination address, or the like. Additionally, or alternatively, the configuration information may identify a port identifier (e.g., a port number), a protocol identifier (e.g., transmission control protocol (TCP), IP, etc.), or the like.

In some implementations, the network address may identify network device 210 and/or management device 230. For example, the source address may identify management device 230, and the destination address may identify network device 210. As another example, the source address may identify network device 210, and the destination address may identify management device 230. As part of the configuration process, network device 210 may be assigned a network address (e.g., an IP address) to be used by translation device 240 when identifying messages to be delivered to network device 210 via a console session. In some implementations, the port identifier may identify a particular port on translation device 240 that is dedicated to handling administration messages.

When translation device 240 receives traffic with one or more parameters that match the configuration information (e.g., that match a network address and a port identifier), translation device 240 may determine that the received traffic is associated with an administration message. An administration message may include, for example, an administration message sent by management device 230 to configure network device 210, a response to an administration message, sent by network device 210 and intended for management device 230, or the like.

As further shown in FIG. 4, process 400 may include detecting a failure in a primary connection associated with the network device (block 420), and providing a notification of the failure (block 430). For example, network device 210 may detect a failure in a primary connection between network device 210 and private network 270. The primary connection may include a direct connection between network device 210 and private network 270, without an intervening connection that includes translation device 240, base station 250, and/or cellular network 260. For example, the primary connection may include a connection between network device 210 and one or more gateways of private network 270.

In some implementations, network device 210 may provide a notification of the failure to translation device 240. The notification may include an explicit notification (e.g., a failure message). Additionally, or alternatively, the notification may include an implicit notification. For example, network device 210 may not send an explicit notification, but may begin sending traffic to translation device 240 for routing and/or forwarding via a cellular connection (e.g., via base station 250 and/or cellular network 260). In some implementations, translation device 240 may detect that a failure has occurred based on a quantity of traffic received from and/or sent to network device 210 (e.g., within a particular period of time).

Translation device 240 may provide a notification of the failure to management device 230, in some implementations. For example, translation device 240 may detect the failure, and may provide, via cellular network 260 (and/or private network 270), a notification of the failure to management device 230. In this way, a network administrator, associated with management device 230, may be notified of the failure and may take corrective action.

As further shown in FIG. 4, process 400 may include receiving traffic, associated with the network device, via a backup connection (block 440). For example, translation device 240 may receive traffic, destined for and/or received from network device 210, via a backup connection. The backup connection may include traversal of cellular network 260. For example, the backup connection may include one or more connections between network device 210, translation device 240, base station 250, cellular network 260, and private network 270. Translation device 240 may provide the traffic to another device for routing and/or forwarding to an intended destination.

As further shown in FIG. 4, process 400 may include determining whether the traffic includes an administration message (block 450). For example, translation device 240 may determine whether the traffic includes an administration message by, for example, determining one or more parameters associated with the traffic. A parameter may include, for example, a network address (e.g., a source address, a destination address, etc.), a port identifier, a protocol identifier, or the like. Translation device 240 may compare the one or more parameters to the configuration information to determine whether the traffic includes an administration message.

For example, if the one or more parameters (e.g., a destination address and a port identifier) match the configuration information, then translation device 240 may determine that the traffic includes an administration message. On the other hand, if the one or more parameters (e.g., a destination address and/or a port identifier) do not match the configuration information, then translation device 240 may determine that the traffic does not include an administration message. In some implementations, translation device 240 may treat administration messages with a higher priority than non-administration messages. For example, administration messages may be queued and/or transmitted before non-administration messages, may receive a higher priority within a queue, etc.

If translation device 240 determines that the traffic does not include an administration message (block 450—NO), then process 400 may include forwarding the traffic toward an intended destination (block 460). For example, translation device 240 may analyze the traffic, and may determine that the traffic does not include an administration message. Based on the determination, translation device 240 may forward the traffic toward an intended destination. The traffic may traverse a backup path that does not include the primary connection. For example, the traffic may traverse a path that includes translation device 240, base station 250, cellular network 260, and/or private network 270.

As an example, the intended destination may include customer device 220 (e.g., when the source is a user device external to the customer premises). In this case, translation device 240 may receive the traffic from base station 250 (e.g., via cellular network 260 and/or private network 270), may forward the traffic to network device 210 (e.g., via a non-console port), and network device 210 may route the traffic to customer device 220. As another example, the intended destination may include a user device external to the customer premises. In this case, translation device 240 may receive the traffic from network device 210, and may forward the traffic to base station 250, which may route the traffic to the user device (e.g., via cellular network 260 and/or private network 270). In this way, network device 210 may utilize a cellular network (e.g., cellular network 260) to provide backup connectivity at the customer premises (e.g., using translation device 240, which may include a cellular modem for connecting with base station 250).

If translation device 240 determines that the traffic does include an administration message (block 450—YES), then process 400 may include translating the administration message (block 470), and providing the translated administration message (block 480). For example, translation device 240 may analyze the traffic, and may determine that the traffic includes an administration message. Based on this determination, translation device 240 may translate the administration message, and may provide the translated administration message to an intended destination.

In some implementations, the administration message may include a message sent by management device 230 and intended for network device 210. In this case, the administration message may include an instruction, such as an instruction for configuring network device 210, an instruction to provide information associated with network device 210, or the like. The administration message may cause network device 210 to execute the instruction. Translation device 240 may receive the administration message from base station 250 (e.g., via private network 270 and/or cellular network 260) over an air interface. The message sent over the air interface may be in a format that is not transmissible over a wired connection (e.g., a serial cable, an Ethernet cable, etc.) that connects translation device 240 to a console port of network device 210.

In this case, translation device 240 may translate the message from a first format, that is transmissible over the air interface, to a second format, that is capable of instructing network device 210 to perform an action (e.g., respond to a query, adjust a configuration parameter, etc.). The second format may be transmissible over a wired connection (e.g., a serial connection) from translation device 240 to a console port interface of network device 210. As an example, the first format may include an IP format (e.g., IPv4, IPv6, etc.), a Secure Shell (SSH) format (e.g., SSH-1, SSH-2, etc.), a Telnet format, etc. As another example, the second format may include a serial console session format.

In some implementations, the second format may depend on a type of network device 210, and translation device 240 may perform the translation based on the type of network device 210. Translation device 240 may translate the administration message from the first format to the second format by decoding the message in the first format to identify the content of the message (e.g., a payload of the message, a body of the message, an instruction included in the message, a console instruction, etc.), and then encoding the content into the second format. Additionally, or alternatively, translation device 240 may modify address information included in the administration message. For example, translation device 240 may translate the message by translating a destination address in an IP format (e.g., an IP address, such as 201.64.10.92) to an address in a serial format associated with a destination (e.g., network device 210) that is connected to translation device 240 via a serial console port. Translation device 240 may provide the translated administration message to network device 210 (e.g., via a wired connection, a console port session, a serial connection, etc.).

In some implementations, the administration message may include a message sent by network device 210 and intended for management device 230. In this case, the administration message may include a response to an instruction received from management device 230. Translation device 240 may receive the message from network device 210 via a wired connection (e.g., a console session utilizing a serial connection). The message sent via the wired connection may be in a format that is not transmissible over an air interface that connects translation device 240 and base station 250.

In this case, translation device 240 may translate the message from a first format, that is not transmissible over the air interface, to a second format, that is transmissible over the air interface. Translation device 240 may translate the administration message from the first format to the second format by decoding the message in the first format to identify the content of the message (e.g., a payload of the message, a body of the message, a response to an instruction, etc.), and then encoding the content into the second format. Additionally, or alternatively, translation device 240 may modify address information included in the administration message. For example, translation device 240 may receive the message via a serial connection, and may translate the message by inserting a destination address in an IP format (e.g., 201.64.10.92) to an intended destination (e.g., management device 230). Translation device 240 may provide the translated administration message to base station 250, via an air interface, for routing to management device 230.

In this way, translation device 240 may provide management device 230 with out-of-band access to a console of network device 210 via a cellular connection, and may further provide a backup path for network device 210 to send and/or receive traffic using the cellular connection.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
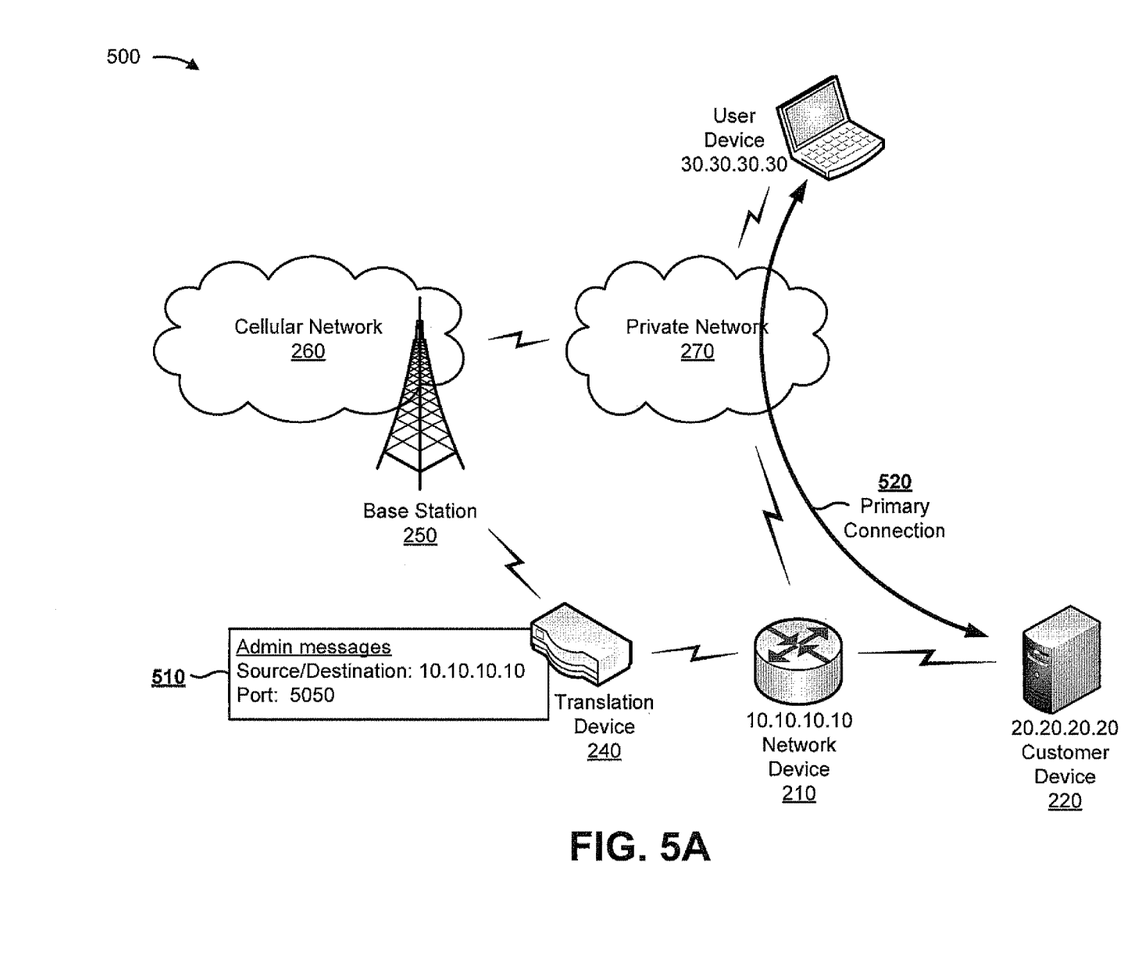
FIGS. 5A-5C are diagrams of an example implementation relating to the example process shown in FIG. 4.
Figure 5B:
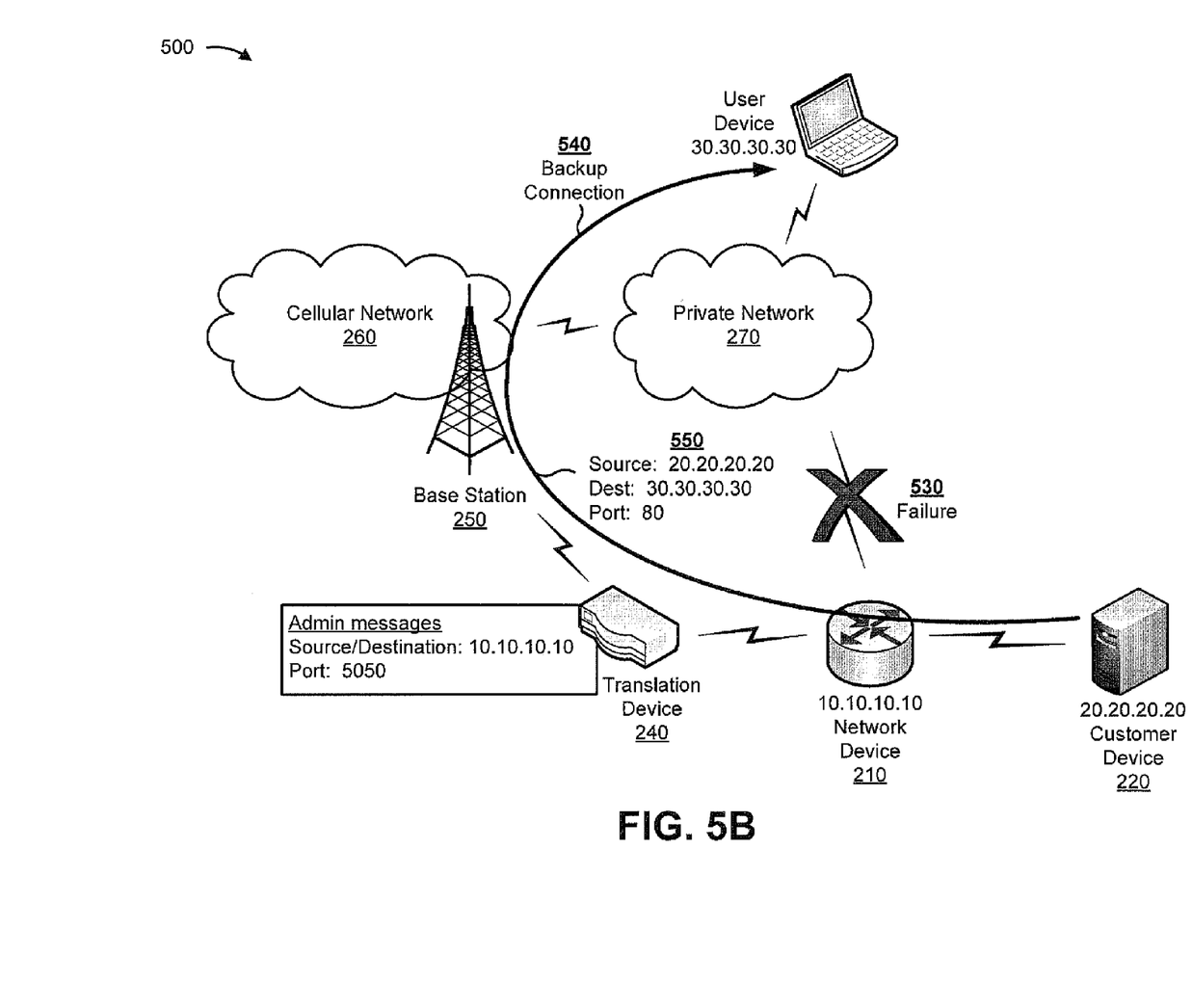
Figure 5C:
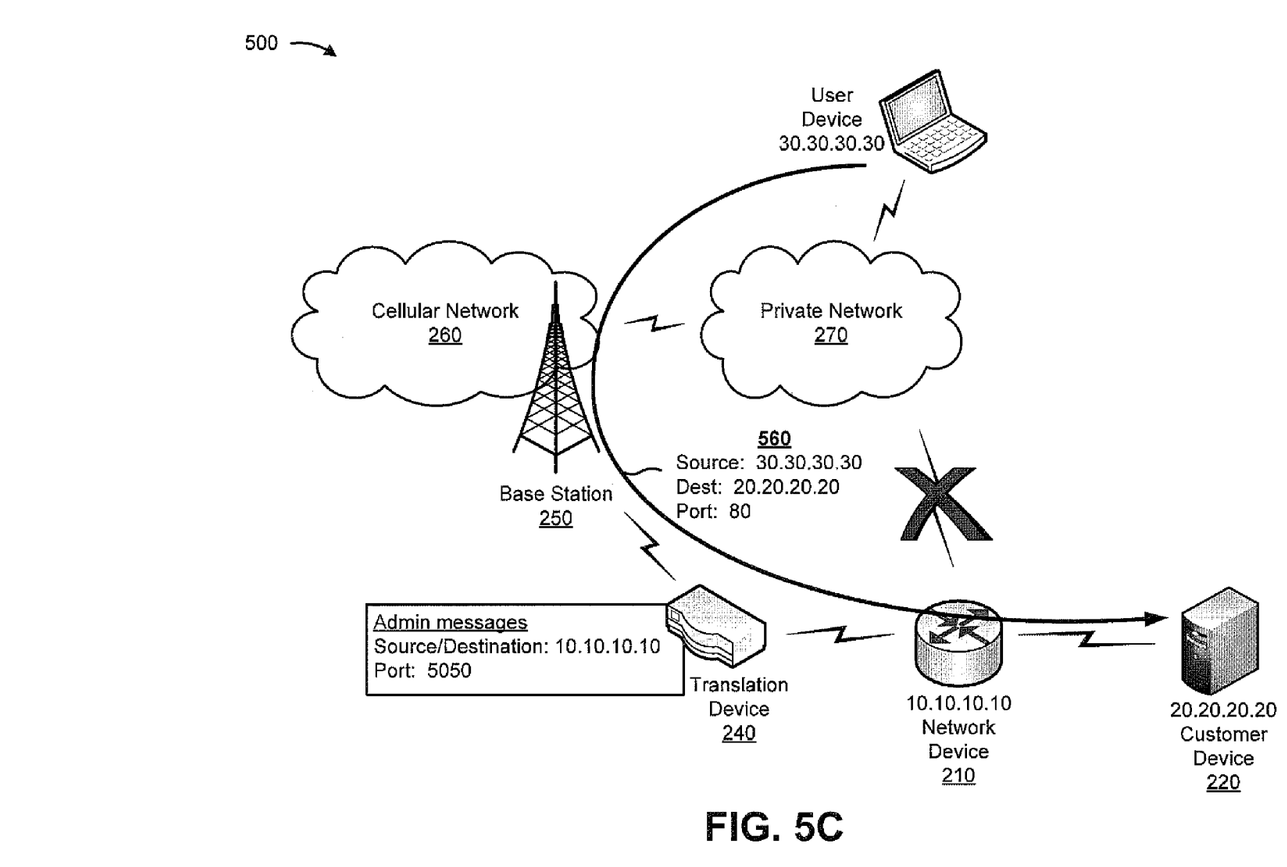

FIGS. 5A-5C are diagrams of an example implementation 500 relating to example process 400 shown in FIG. 4. FIGS. 5A-5C show an example of providing a cellular backup connection to network device 210 in the event of a failure in a primary connection between network device 210 and private network 270.

As shown in FIG. 5A, and by reference number 510, assume that translation device 240 receives configuration information that identifies traffic associated with an administration message for managing network device 210. As shown, traffic that includes an administration message will include a source IP address or a destination IP address of 10.10.10.10, which is a network address that identifies network device 210. Furthermore, traffic that includes an administration message will arrive on port 5050 of translation device 240. When translation device 240 receives traffic that matches these parameters, translation device 240 will translate the traffic and provide the administration message to the appropriate device (e.g., network device 210 or management device 230).

As further shown in FIG. 5A, and by reference number 520, assume that network device 210 is routing traffic between customer device 220 and a user device via private network 270. In other words, assume that a primary connection between network device 210 and private network 270 is active.

As shown in FIG. 5B, and by reference number 530, assume that there is a failure in the primary connection between network device 210 and private network 270. As a result, network device 210 begins routing traffic via a backup connection 540 that includes translation device 240, base station 250, cellular network 260, and private network 270. For example, assume that customer device 220 is identified by an IP address of 20.20.20.20, and the user device is identified by an IP address of 30.30.30.30.

As shown by reference number 550, assume that network device 210 transmits a message from customer device 220 (e.g., with a source IP address of 20.20.20.20), with the user device as the intended destination (e.g., with a destination IP address of 30.30.30.30), and a port identifier of port 80. Translation device 240 receives the message from network device 210, on port 80, and determines that the source address, the destination address, and the port identifier do not match the stored configuration information that identifies administration messages. As a result, translation device 240 forwards the message to base station 250 for delivery to the user device via cellular network 260 and private network 270.

Similarly, as shown in FIG. 5C, assume that the user device (identified as 30.30.30.30) transmits a message intended for customer device 220 (e.g., identified as 20.20.20.20). The message may be routed via private network 270, cellular network 260, and base station 250 to arrive at translation device 240. Translation device 240 may determine the traffic parameters, as shown by reference number 560. Translation device 240 may determine that the traffic parameters do not match the stored configuration information, and may forward the message to network device 210 for delivery to customer device 220. In this way, translation device 240 may provide a backup path for network device 210, via a cellular connection, when a primary connection between network device 210 and private network 270 experiences a failure.

As indicated above, FIGS. 5A-5C are provided merely as an example. Other examples are possible and may differ from what was described with regard to FIGS. 5A-5C.

Figure 6A:
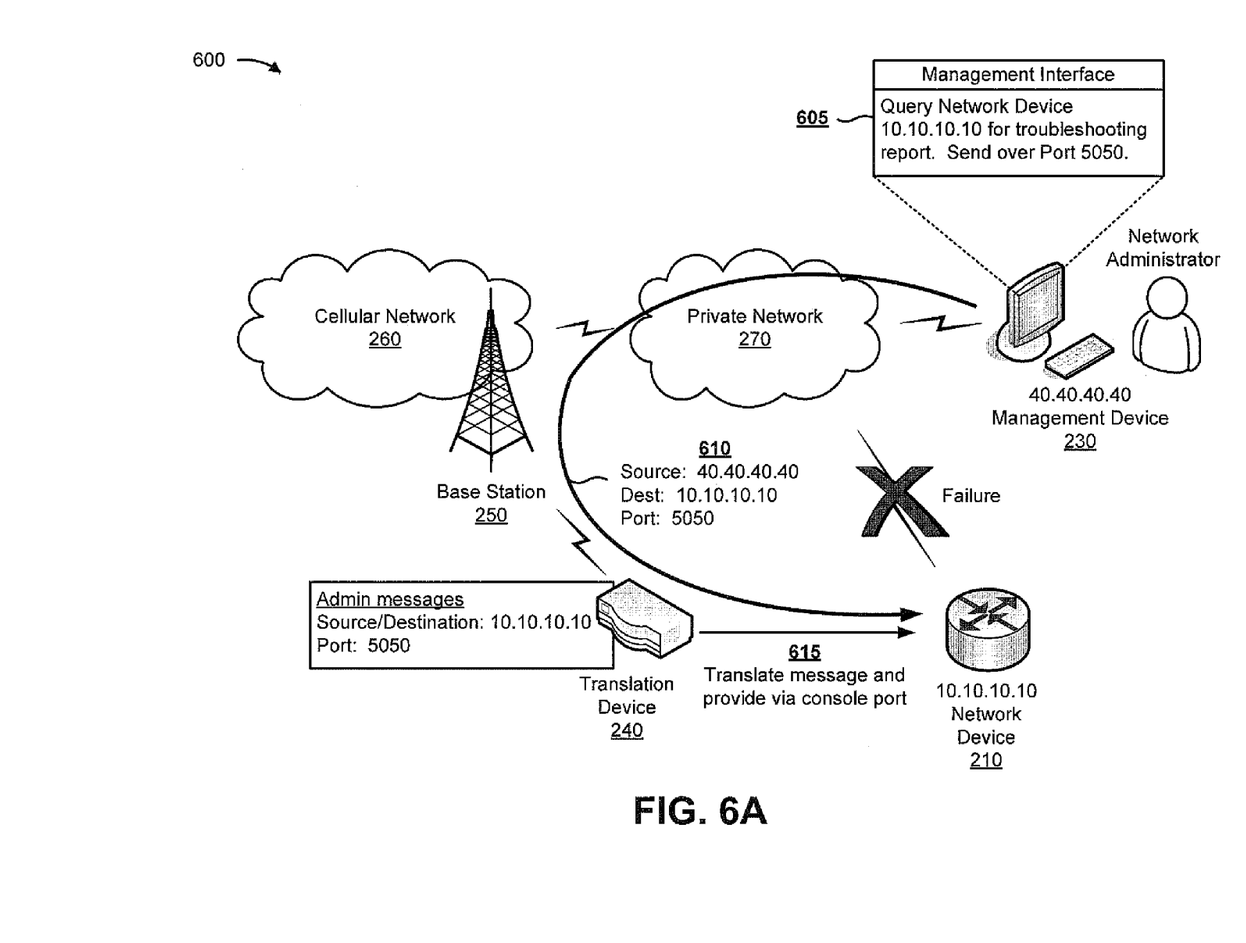
FIGS. 6A-6C are diagrams of another example implementation relating to the example process shown in FIG. 4.
Figure 6B:
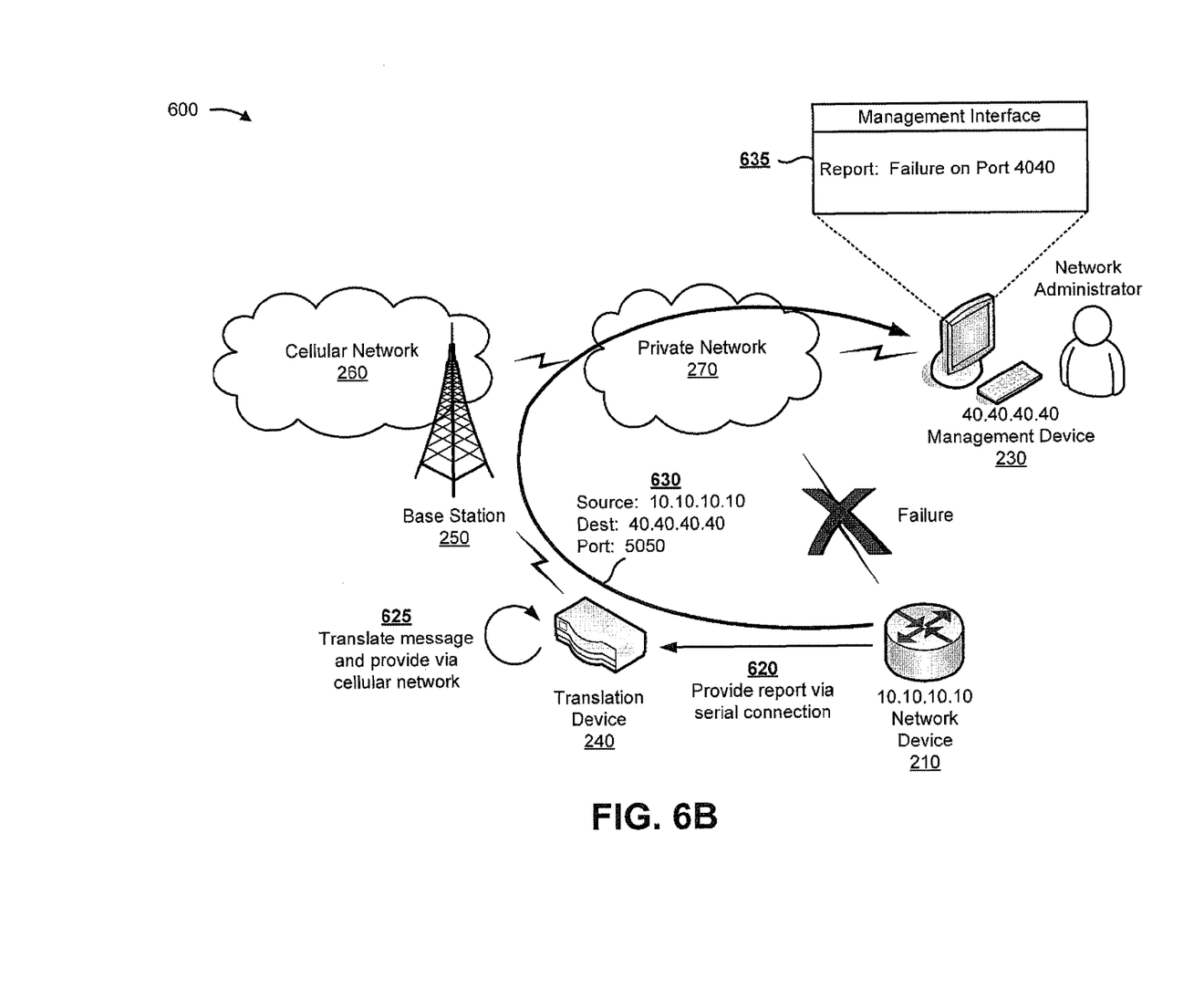
Figure 6C:
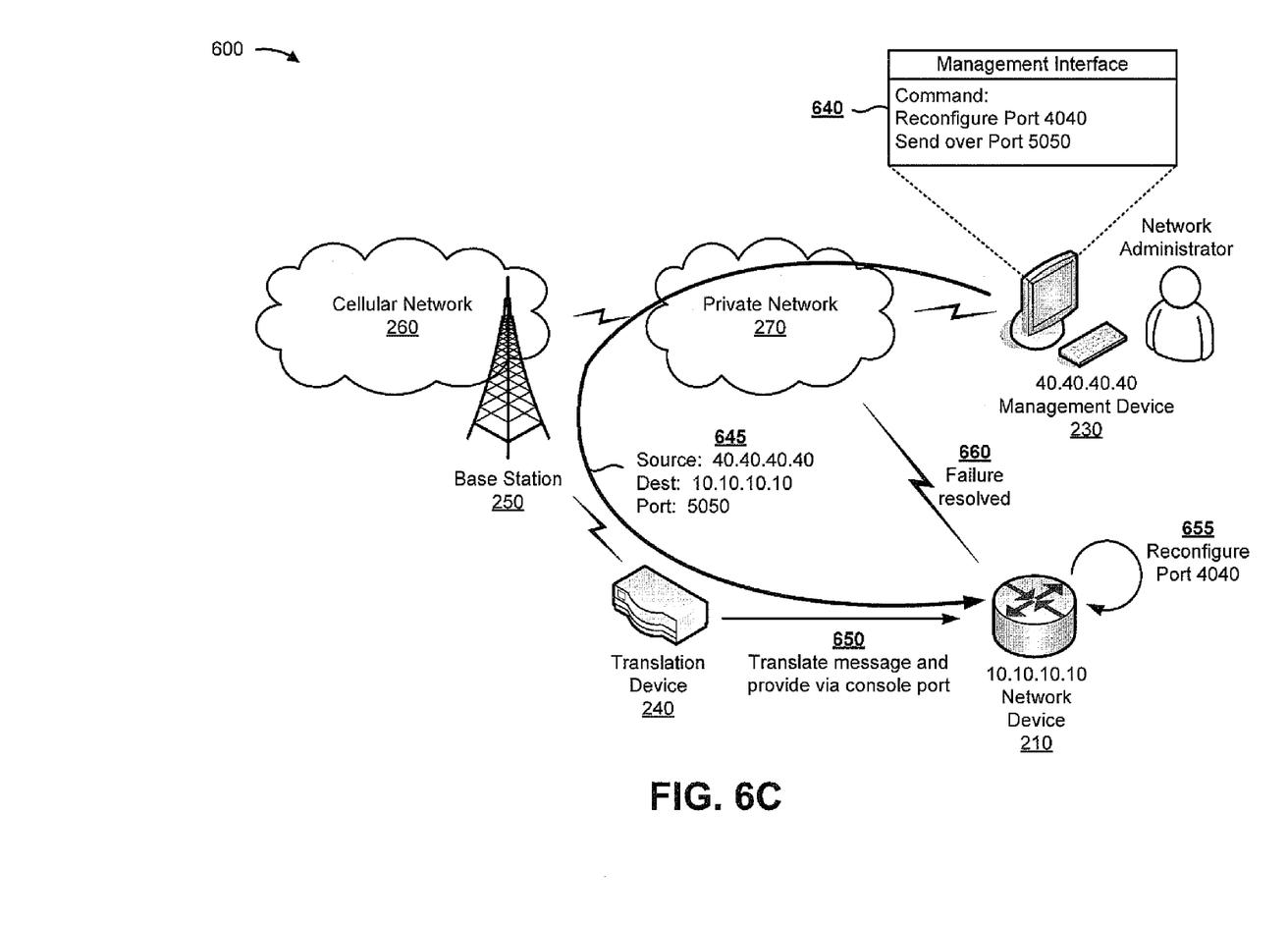

FIGS. 6A-6C are diagrams of another example implementation 600 relating to example process 400 shown in FIG. 4. FIGS. 6A-6C show an example of providing management device 230 with out-of-band console access to network device 210 via a cellular connection.

As shown in FIG. 6A, assume that there is still a failure in the primary connection between network device 210 and private network 270. As shown by reference number 605, assume that a network administrator is interacting with management device 230 (e.g., identified by a network address of 40.40.40.40) to troubleshoot network device 210. For example, assume that the network administrator inputs an instruction to query network device 210 (e.g., identified by network address 10.10.10.10) to provide a troubleshooting report. Assume that the message is to be sent via port 5050 of translation device 240. Further, assume that the message is routed to translation device 240 via private network 270, cellular network 260, and base station 250.

As shown by reference number 610, the message includes a source IP address of 40.40.40.40, a destination IP address of 10.10.10.10, and a port identifier of 5050. Assume that translation device 240 receives the message and compares these parameters to stored configuration information to determine that the message is an administration message. As shown by reference number 615, based on this determination, translation device 240 translates the administration message and provides the translated message to network device 210 via a console port (e.g., via a wired serial connection between translation device 240 and network device 210).

As shown in FIG. 6B, and by reference number 620, assume that network device 210 receives the administration message, generates a troubleshooting report, and provides the report in a message sent over the wired serial connection between network device 210 and translation device 240. Translation device 240 may determine that the message is an administration message because the message was received via a console port session with network device 210 (e.g., over a serial connection with the console port of network device 210). As shown by reference number 625, based on this determination, translation device 240 may translate the message and send the message toward management device 230 via cellular network 260. For example, as shown by reference number 630, translation device 240 may append a source IP address (e.g., 10.10.10.10), a destination IP address (e.g., 40.40.40.40), and/or a port identifier (e.g., 5050) to the message, and may provide the message to base station 250 for delivery to management device 230 (e.g., via cellular network 260 and private network 270). As shown by reference number 635, management device 230 may receive the message, and may provide contents of the message, such as the troubleshooting report, for display. For example, assume that management device 230 provides an indication that there is a failure on port 4040 of network device 210.

As shown in FIG. 6C, and by reference number 640, assume that the network administrator inputs a command, via management device 230, that includes an instruction for network device 210 to reconfigure port 4040. Assume that the message is to be sent via port 5050 of translation device 240. Further, assume that the message is routed to translation device 240 via private network 270, cellular network 260, and base station 250.

As shown by reference number 645, the message includes a source IP address of 40.40.40.40, a destination IP address of 10.10.10.10, and a port identifier of 5050. Assume that translation device 240 receives the message and compares these parameters to stored configuration information to determine that the message is an administration message. As shown by reference number 650, based on this determination, translation device 240 translates the administration message and provides the translated message to network device 210 via a console port (e.g., via the wired serial connection between translation device 240 and network device 210).

As shown by reference number 655, network device 210 receives the message and executes the instruction included in the message to reconfigure port 4040. Assume that the reconfiguration resolves the failure in the primary connection between network device 210 and private network 270, and that the connection is restored, as shown by reference 660. In this way, translation device 240 may provide a mechanism for management device 230 to access a console of network device 210 via a cellular connection, and to manage, troubleshoot, configure, etc. network device 210 via the cellular connection.

As indicated above, FIGS. 6A-6C are provided merely as an example. Other examples are possible and may differ from what was described with regard to FIGS. 6A-6C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Similarly, as used herein, a "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A translation device, comprising:
   one or more processors to:
      receive configuration information that is to be used to identify an administration message for managing a network device via a console session with the network device;
      receive, from the network device, a notification of a failure associated with a primary connection of the network device,
         the primary connection including a direct connection between the network device and a private network;
      provide the notification of the failure to a management device;
      receive traffic, destined for the network device, from the management device and via an air interface of a cellular network, based on providing the notification of the failure to the management device;
      compare a first parameter identified in the configuration information and a second parameter identified in the traffic;
      determine whether the traffic includes the administration message based on comparing the first parameter and the second parameter; and
      selectively perform a first action or a second action based on determining whether the traffic includes the administration message.

2. The translation device of claim 1, where
   the first action includes forwarding the traffic to a non-console port of the network device based on determining that the traffic does not include the administration message; and
   the second action includes:
      translating the traffic, to form translated traffic, for transmission to a console port of the network device to establish the console session, and
      forwarding the translated traffic to the console port of the network device, based on determining that the traffic includes the administration message.

3. The translation device of claim 1,
   where the first parameter identifies a first network address; and
   where the second parameter identifies a second network address.

4. The translation device of claim 1, where the first parameter includes a destination address that identifies the network device and identifies a port included in the translation device.

5. The translation device of claim 1, where the one or more processors are further to:
   perform the second action; and
   translate the traffic by translating an Internet protocol (IP) address, associated with the network device, to a serial address associated with a console port of the network device.

6. The translation device of claim 1, where the one or more processors are further to:
   perform the second action; and
   translate the traffic from a first format, transmissible via the air interface, to a second format, transmissible via a wired connection and capable of providing the administration message to the network device via a console port, the administration message causing the network device to execute an instruction identified in the administration message.

7. The translation device of claim 1, where the one or more processors are further to:

receive a response message, via a console port of the network device, based on the administration message;

translate the response message to a format transmissible via the air interface and to generate a translated response message; and provide the translated response message via the air interface.

8. A computer-readable medium storing instructions, the instructions comprising:

one or more instructions that, when executed by one or more processors of a translation device, cause the one or more processors to:

receive configuration information that is associated with an administration message for managing a network device via a console session with the network device;

receive, from the network device, a notification of a failure associated with a primary connection of the network device, the primary connection including a direct connection between the network device and a private network;

provide the notification of the failure to a management device;

receive a message, destined for the network device, from the management device and via an air interface of a cellular network, based on providing the notification of the failure to the management device;

compare a first parameter identified in the configuration information and a second parameter identified in the message;

determine that the message includes the administration message based on comparing the first parameter and the second parameter;

translate the administration message from a first format, received via the air interface, to a second format for transmission to a console port of the network device and to generate a translated administration message; and provide the translated administration message, via a wired connection, to the console port of the network device, the translated administration message causing the network device to execute an instruction included in the translated administration message.

9. The computer-readable medium of claim 8,
where the first format is an Internet protocol (IP) format; and
where the second format is a serial format.

10. The computer-readable medium of claim 8,
where the first parameter identifies a network address of the network device and the console port is dedicated to providing administration messages to the network device, and
where the administration messages include the administration message.

11. The computer-readable medium of claim 8, where the instructions further comprise:

one or more instructions that, when executed by the one or more processors, cause the one or more processors to:

receive a response message, via the console port of the network device, based on the instruction executed by the network device;

translate the response message to a format transmissible via the air interface and to generate a translated response message; and provide the translated response message via the air interface.

12. The computer-readable medium of claim 11, where the instructions further comprise:

one or more instructions that, when executed by the one or more processors, cause the one or more processors to:

append a network address to the response message,
the network address identifying the management device that sent the administration message.

13. The computer-readable medium of claim 8, where the instruction, included in the translated administration message, causes the network device to provide information associated with the network device or to configure the network device.

14. The computer-readable medium of claim 8,
where the first parameter identifies a first network address; and
where the second parameter identifies a second network address.

15. A method, comprising:

receiving, by a translation device, configuration information that is associated with an administration message for managing a network device via a console session with the network device;

receiving, by the translation device and from the network device, a notification of a failure associated with a primary connection of the network device, the primary connection including a direct connection between the network device and a private network;

providing, by the translation device, the notification of the failure to a management device;

receiving, by the translation device, from the management device, and via an air interface of a cellular network, a message destined for the network device, based on providing the notification of the failure to the management device;

comparing, by the translation device, a first set of parameters identified in the configuration information and a second set of parameters identified in the message;

determining, by the translation device and based on comparing the first set of parameters and the second set of parameters, that the message includes the administration message for managing the network device via the console session;

translating, by the translation device, the administration message from a first format, in which the administration message is received, to a second format and to obtain a translated administration message, the second format permitting the network device to receive the administration message via a console port and to execute an instruction identified in the administration message; and providing, by the translation device and via a wired connection, the translated administration message to the console port of the network device, the translated administration message causing the network device to execute the instruction.

16. The method of claim 15, further comprising:
  detecting another failure associated with the network device; and
  providing another notification of the other failure to the management device.

17. The method of claim 15,
where the first set of parameters includes a first network address associated with the network device;
where the second set of parameters includes a second network address identified in the message;
where the method further comprises:
  comparing the first network address and the second network address;
  determining that the first network address matches the second network address based on comparing the first network address and the second network address; and
  determining that the message includes the administration message based on determining that the first network address matches the second network address.

18. The method of claim 15,
where the first set of parameters includes a first port identifier associated with the translation device;
where the second set of parameters includes a second port identifier identified in the message;
where the method further comprises:
  comparing the first port identifier and the second port identifier;
  determining that the first port identifier matches the second port identifier based on comparing the first port identifier and the second port identifier; and
  determining that the message includes the administration message based on determining that the first port identifier matches the second port identifier.

19. The method of claim 15,
where the first format includes an Internet protocol (IP) format;
where the second format includes a serial format; and
where the method further comprises:
  replacing an IP address, in the IP format and identified in the administration message, with a serial address in the serial format.

20. The method of claim 15, further comprising:
receiving a response message, via the console port of the network device, based on providing the translated administration message to the console port of the network device;
translating the response message to a format transmissible via the air interface and to generate a translated response message; and
providing the translated response message to the management device via the air interface.

* * * * *